(12) United States Patent
Prakash et al.

(10) Patent No.: US 10,735,590 B2
(45) Date of Patent: Aug. 4, 2020

(54) FRAMEWORK FOR PREDICTIVE CUSTOMER CARE SUPPORT

(71) Applicant: T-Mobile USA, Inc., Bellevue, WA (US)

(72) Inventors: Sumeet Prakash, Issaquah, WA (US); Anjani Deepthi Nandigam, Redmond, WA (US); Hamza Syed, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/230,834

(22) Filed: Dec. 21, 2018

(65) Prior Publication Data

US 2020/0204680 A1  Jun. 25, 2020

(51) Int. Cl.
*H04M 3/523* (2006.01)
*G06N 20/00* (2019.01)
*H04M 3/08* (2006.01)
*H04M 3/51* (2006.01)

(52) U.S. Cl.
CPC .......... *H04M 3/5232* (2013.01); *G06N 20/00* (2019.01); *H04M 3/085* (2013.01); *H04M 3/5175* (2013.01)

(58) Field of Classification Search
CPC .......... H04M 3/523; H04M 3/51; H04M 3/08; G06N 20/00

USPC ........ 379/9.03, 9.04, 27.01, 32.01; 715/736; 709/224; 370/216
See application file for complete search history.

(56) References Cited

U.S. PATENT DOCUMENTS

| | | | |
|---|---|---|---|
| 2008/0181100 A1* | 7/2008 | Yang | H04L 41/0654 370/216 |
| 2016/0028645 A1* | 1/2016 | Hohn | H04L 41/064 709/224 |
| 2018/0152884 A1* | 5/2018 | Hu | H04W 48/18 |
| 2019/0097873 A1* | 3/2019 | Nucci | H04L 41/0631 |

* cited by examiner

*Primary Examiner* — Melur Ramakrishnaiah
(74) *Attorney, Agent, or Firm* — Han Santos, PLLC (57) ABSTRACT

Decreasing the time to resolution of trouble tickets and preemptively resolving potential network issues using a predictive customer care support framework communicatively coupled to a telecommunications service provider via a network is described. Techniques described herein include preprocessing ticket data associated with a trouble ticket corresponding to a subscriber using a decision engine that can implement a decision tree scheme to automatically identify appropriate data sources from which relevant data can be routed to the decision engine in a bundled format. The techniques further include detecting potential network issues not yet reported by subscribers using an analytical engine to identify a root cause for the potential network issues and implementing recommended solutions to reduce an influx of trouble tickets at a customer support terminal.

18 Claims, 4 Drawing Sheets

FIG. 4

FRAMEWORK FOR PREDICTIVE CUSTOMER CARE SUPPORT

BACKGROUND

Managing customer care support and service requests come with many challenges that frustrate businesses and customers alike. From a business's point of view, managing service requests generally include a number of steps, including logging a service request or creating a ticket, assigning the ticket to a customer care support technician, resolving the ticket, communicating with the customer, and closing the ticket. In order to resolve each ticket, the technician or the customer care support representative access a number of disjointed data sources to obtain relevant information about a customer's account, service or product issues, and/or so forth. Thereafter, various troubleshooting tools can be applied to identify issues and implement recommended solutions, generally using a trial and error approach.

From a customer's point of view, most would experience long wait times and no or limited access to or use of the business's products or services. In this regard, an improved framework that allows various data sources and troubleshooting tools to work in concert can help eliminate the complexity of customer service management and lower time to resolution of trouble tickets. Additionally, preemptively addressing frequently raised issues based on trouble tickets or customer feedback can help reduce overall operation costs and improve customer experience and satisfaction.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

This disclosure is directed to techniques for increasing the efficiency for processing trouble tickets by consolidating data and preemptively addressing issues from subscribers of a telecommunication service by predicting errors based on detected anomalies. In various embodiments, a predictive customer care support framework may include a decision engine for receiving and preprocessing trouble tickets from a customer support terminal. The decision engine can implement various validation techniques in order to validate ticket data in each trouble ticket, wherein the ticket data can be parsed for validation. The ticket data may include network issues or other operational issues and subscriber related information (i.e., account information). Upon validating the ticket data, the decision engine can implement various decision making algorithms (e.g., a decision tree) in order to request relevant data from one or more data sources in communication with the network. For example, the decision engine can provide binary questions in order to properly identify one or more data sources from which the decision engine can request relevant data to resolve the trouble ticket based on the ticket data. The one or more data sources can bundle the relevant data for transmission to the decision engine.

In various embodiments, the predictive customer care support framework can generate status reports using ticket data and categorize the issues (e.g., network issues) and determine the frequency of their occurrence. For instance, the decision engine can automatically sort trouble tickets by the type of network issues in the ticket data. In this regard, the decision engine can categorize one trouble ticket under one or more categories. Additionally, or alternatively, the decision engine can tag trouble tickets, and tags associated with the trouble tickets can be used to categorize the trouble tickets. The status reports can include, without limitation, the dates, times, and/or locations particular network issues occurred, the number of times the network issues occurred (i.e., frequency), the identified root cause of the network issues, the solution implemented to resolve the network issues, trouble ticket flows, the time to resolution of trouble tickets, the number of tickets resolved, the number of affected subscribers, the amount of impact per subscriber, network performance data, and/or so forth.

The status reports can be used to predict potential network issues not yet reported by subscribers. More particularly, the status reports can be analyzed via the analytical engine to identify any anomaly and trends that may indicate potential network issues. In various embodiments, various machine learning techniques can be implemented. Upon identifying potential network issues, the analytical engine can identify a root cause of the potential network issues and implement recommended solutions for a resolution. In this way, network issues can be resolved promptly after a trouble ticket is submitted or even before a trouble ticket is submitted.

The predictive customer care support framework can also provide a notification engine that can transmit scheduled alerts, announcements, or notifications to one or more subscribers. For example, the notification engine can provide status updates to subscribers who submitted trouble tickets. Additionally, the notification engine can provide information relating to potential network issues and implemented solutions, if any, as well as the outcome of the implemented solutions. In various embodiments, the notification engine can also transmit scheduled alerts, announcements, or notifications to administrators or third party entities working with a telecommunications service provider in order to provide various reports.

While the exemplary embodiments are directed to a framework for providing customer care support for telecommunications service providers in a cellular network environment, the techniques described herein may be applied in a number of ways. Example implementations are provided below with reference to the following figures.

Example Network Architecture

Figure 1:
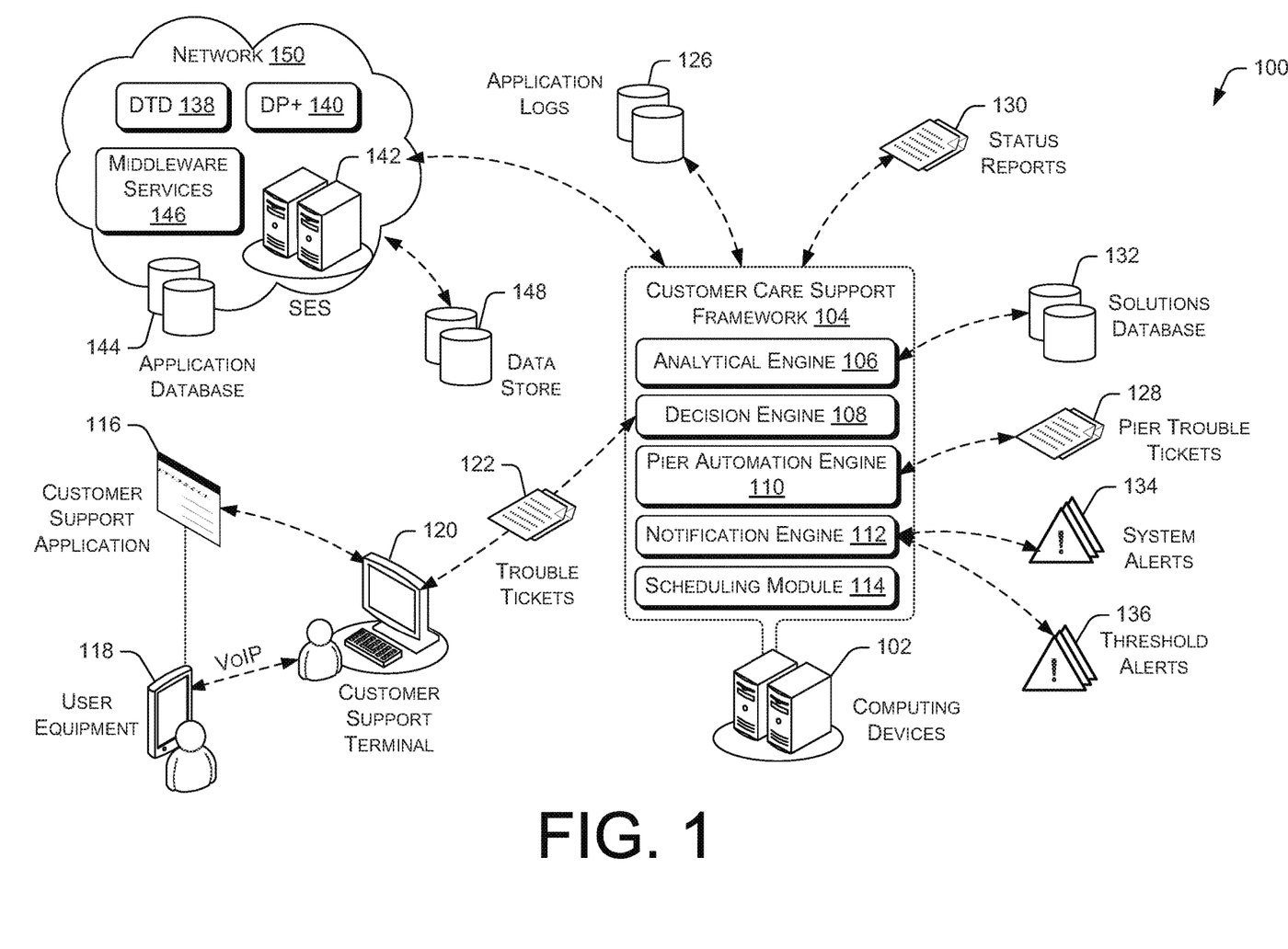
FIG. 1 illustrates an example network architecture for providing a predictive customer care support framework.

FIG. 1 illustrates an example architecture for providing a customer care support framework. The architecture 100 may include one or more user equipment 118, wherein the user equipment 118 comprises smartphones, mobile devices, personal digital assistants (PDAs) or other electronic devices having a wireless communication function that is capable of receiving inputs, processing the inputs, and generating output data. The user equipment 118 is connected to a telecommunication network 150 utilizing one or more wireless base stations or any other common wireless or wireline network access technology. The telecommunication network 150 can be a cellular network that implements 2G, 3G, 4G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), WiMax, and WiFi access technologies.

In various embodiments, the telecommunication network 150 can include an application database 144, middleware services 146, secure entitlement server (SES) 142, and/or other network elements (NEs). The network elements (e.g., the application database 144, middleware services 146, SES 142, etc.) can employ the same data type definition (DTD) 138 for interworking to occur. The telecommunication network 150 can also comprise or communicate with various data sources such as application logs 126, system logs, status reports 130, or a data store 148, which can include a home subscriber server (HSS), a home location register (HLR), and a data preparation (DP) or DP enhanced (DP+) 140. Additionally, the data store 148 can store embedded UICC identifier (EID), integrated circuit card identifier (ICCID), customer account data, and/or so forth.

The user equipment 118 can communicate with a customer support terminal 120 via a customer support application 116. The customer support application 116 can be supported by a telecommunication service provider or a third-party entity that is working with the telecommunication service provider. In various embodiments, the customer support application 116 can provide a knowledge base where subscribers can access answers to common questions, a discussion forum or a social platform for interacting with other subscribers or customer support technicians, a live chat tool, a messaging tool, a trouble ticket generation tool, and/or so forth. Additionally, or alternatively, the user equipment 118 can directly communicate with the customer support terminal 120 via voice over Internet protocol (VoIP), conversation interfaces (CI), chat user interfaces (UI), and/ or so forth.

The customer support terminal 120 can include one or more computing devices operated by customer support technicians working with a telecommunications service provider. The computing devices can be any general-purpose computers such as desktop computers, laptops, tablets, or other electronic devices that are capable of receive inputs, process the inputs, and generate output data. The customer support terminal 120 can be configured to execute customer service software applications for interfacing with customers, generating customer service session notes, generating trouble tickets 122, receiving trouble ticket information, propagating the trouble tickets 122 to a customer care support framework 104, and managing the trouble tickets 122.

The architecture 100 can further include one or more computing devices 102, wherein the computing devices 102 can comprise a server. The computing device 102 is in communication with the user equipment 118 via one or more network(s), such as the telecommunication network 150. The computing device 102 can also include any general-purpose computers, such as desktop computers, laptops, tablets, servers (e.g., on-premise servers), or other electronic devices that are capable of receiving inputs, processing the inputs, and generating output data. The computing device 102 may also be operated by a telecommunication service provider or a third-party entity that is working with the telecommunication service provider. The computing device 102 may store data in a distributed storage system.

Accordingly, the computing device 102 may provide data and processing redundancy, in which data processing and data storage may be scaled in response to demand. Further, in a networked deployment, load balancers can add new computing devices and remove unhealthy computing devices. Thus, the computing device 102 can include a plurality of physical machines that may be grouped together and presented as a single computing system. Each physical machine of the plurality of physical machines may comprise a node in a cluster. The computing device 102 may also be in the form of virtual machines, such as virtual engines (VE) and virtual private servers (VPS).

The computing device 102 is configured to provide the customer care support framework 104. Without limitation, the customer care support framework 104 may include an analytical engine 106, a decision engine 108, a pier automation engine 110, a notification engine 112, and a scheduling module 114 comprising one or more schedulers. In various embodiments, the customer care support framework 104 can also provide customer service software application for performing functions of the customer support terminal 120, such as interfacing with subscribers, generating customer service session notes, generating trouble tickets 122, propagating the trouble tickets 122 to a customer care support framework 104, and managing the trouble tickets 122.

The decision engine 108 can receive trouble tickets 122 from the customer support terminal 120. Each trouble ticket 122 corresponds to a subscriber and comprises ticket data. Without limitation, ticket data can include a subscriber's account information, which can be associated with a plurality of user equipment and a plurality of users. More specifically, the account information can include EID and/or ICCID corresponding to a user equipment, a subscriber's status, and/or so forth. Additionally, the ticket data can comprise details relating to network issues or other operational issues experienced by subscribers, the type of network issues experienced, and/or so forth. The decision engine 108 processes the ticket data using a decision support tool that can apply a tree-like graph (i.e., a decision tree) or a model of decisions and their possible outcomes. More specifically, the decision tree comprises one or more questions, wherein each question generally provides two options, each option having sub-branches with two more options, and so on until the process reaches its logical end. The binary nature of processing the ticket data allows the decision engine 108 to automatically identify the data sources to request relevant data from in order to resolve the trouble ticket 122.

For example, the decision engine 108 can inquire whether the ticket data comprises a subscriber's status information. Upon receiving a "yes" response, the decision engine 108 can inquire whether the subscriber's status is active. If the decision engine 108 receives a "no" response, the decision engine 108 can trigger the pier automation engine 110 to close the trouble ticket 122. Additionally, the decision engine 108 can trigger the notification engine 112 to notify the subscriber that the trouble ticket 122 is closed. If the subscriber's status is active, the decision engine 108 can inquire whether the ticket data comprises EID, depending upon embodiments. Upon receiving a "yes" response, the decision engine 108 can request the HLR to provide the subscriber's records. The decision engine 108 can continue the decision making process until all of the ticket data is reviewed to request data from appropriate data sources. It is noted that the decision support tool of the decision engine can implement various types of machine learning techniques, depending upon embodiments.

In various embodiments, the decision engine 108 can implement a parser to parse ticket data in each trouble ticket 122, applying a set of predetermined parameters. For instance, the parser can cut strings of textual data in a trouble ticket 122 based on its label. Parsed ticket data can be processed via the decision engine 108 to identify appropriate data sources from which the decision engine 108 can request relevant information to resolve a trouble ticket 122. Upon identifying the appropriate data sources based on the ticket data, the decision engine 108 can request data (e.g. relevant information) from a plurality of data sources in a concurrent manner. In this way, the decision engine 108 eliminates the need for customer support technicians to individually query different data sources for relevant information. The decision engine 108 may request the same data from more than one data source for redundancy and reliability. Thus, requested data en route to the decision engine 108 can be consolidated, via for example, a data consolidation tool operatively connected to the decision engine 108. Particularly, similar data from more than one data source can be compared and if a degree of affinity among the data exceeds a predetermined value, replicates of the data are removed. Additionally, requested data can be bundled together such that all requested data being retrieved via the decision engine 108 can be transmitted simultaneously.

In various embodiments, the decision engine 108 can implement a validation module for validating the ticket data. If a trouble ticket 122 comprises invalid ticket data, the decision engine 108 is configured to trigger the pier automation engine 110 to automatically close out the trouble ticket 122. For example, the decision engine 108 can trigger the pier automation engine 110 to close the trouble ticket 122 upon determining, via the validation module, that the ticket data comprises information relating to an invalid customer account number or an inactive account. In another instance, the decision engine 108 can trigger the notification engine 112 to request the subscriber for additional information upon determining, via the validation module, that the ticket data comprises an EID that does not belong to an account holder.

The decision engine 108 can also categorize the trouble tickets 122 based at least partially on the ticket data. For example, the trouble tickets 122 can be categorized into one or more categories according to network issues. The decision engine 108 can use keywords, phrases, or other defined criteria (e.g., device or user equipment type, location, etc.) to categorize the trouble tickets 122. Additionally, or alternatively, the decision engine 108 can tag the trouble tickets 122 with one or more keywords. One or more tags associated with the trouble tickets 122 can be used to categorize the trouble tickets 122.

Upon retrieving relevant data from one or more data sources, the decision engine 108 passes on the retrieved information to the analytical engine 106 for identifying a root cause for one or more network issues included in a trouble ticket 122. The analytical engine 106 can also implement a decision support tool and/or apply various machine learning techniques to identify a root cause. More specifically, the decision support tool can utilize a decision tree that comprises a predetermined set of questions. For example, each question can provide two options, "yes" or "no," and each option can have sub-branches with the same "yes" or "no," and so on until the process reaches its logical end, i.e., a root cause of a network issue. Upon determining a root cause, the analytical engine 106 can retrieve a recommended solution for implementation from a solutions database 132. The solutions database 132 can include a table of solutions for each root cause. The analytical engine 106 can select the solutions based on one or more parameters. For example, the one or more parameters can include the likelihood of success of each solution and/or notes from previous customer support sessions for similar network issues.

The decision engine 108 can determine whether the implemented solution resolved the network issue in question. If the decision engine 108 determines that the implemented solution did not resolve the network issue, the decision engine 108 triggers the analytical engine 106 to implement a different solution. Thereafter, the analytical engine 106 can access the solutions database 132 to retrieve another recommended solution for implementation. If the network issues are resolved, the decision engine 108 can trigger the notification engine 112 to propagate a system alert 134 to the user equipment 118 to inform the subscriber corresponding to the trouble ticket 122 that the network issues are resolved. Additionally, the pier automation engine 110 can close the trouble tickets 128.

Ticket data obtained from dispatched trouble tickets 122, notes from customer support sessions, and/or notes relating to a root cause and resolution of each of the dispatched trouble tickets 122 can be recorded in the system log and/or reported in status reports 130. The status reports 130 can include, without limitation, the dates, times, and/or locations particular network issues occurred, the number of times the network issues occurred (i.e., frequency), the identified root cause of the network issues, the solution implemented to resolve the network issues, trouble ticket flows, the time to resolution of trouble tickets, the number of tickets resolved, the number of affected subscribers, the amount of impact per subscriber, network performance data, and/or so forth. The status reports 130 can be provided to the customer care support framework 104 or another administrative entity on a scheduled basis in accordance with the parameters set forth by the scheduling module 114.

The analytical engine 106 can conduct time series analysis to review the status reports 130, which may include time series data in order to identify any anomaly and trends that may indicate potential network issues. The analytical engine 106 can implement the decision support tool and/or apply various machine learning techniques to identify potential network issues. For example, the analytical engine 106 can determine a potential impact factor associated with the anomaly for one or more subscribers. The potential impact factor can be calculated in various ways based at least partially on one or more parameters related to a subscriber's network usage and user equipment associated therewith. Additionally, the analytical engine 106 can determine the frequency with which a particular network issue occurs. Upon determining that the frequency with which the network issue occurs exceeds a predetermined threshold, the analytical engine 106 can trigger the notification engine 112 to propagate threshold alerts 136 to an administrative entity and/or one or more customer support terminals 120 to notify of a potential network issue. Upon identifying potential network issues, the analytical engine 106 can identify a root cause and implement solutions to resolve the potential network issues. In this way, the customer care support framework 104 can preemptively identify potential network issues not yet addressed in the trouble tickets 122. Alternatively, the customer care support framework 104 can preemptively identify potential network issues not yet affecting a large number of subscribers.

In various embodiments, the system alerts 134 and threshold alerts 136 can be propagated in batches on a scheduled basis. In this regard, the customer care support framework 104 can implement the scheduling module 114. The scheduling module 114 can include one or more schedulers. Each scheduler can be configured to transmit a predetermined set of alerts or notifications at a specific time. For example, the scheduling module 114 can include a first scheduler and a second scheduler. The first scheduler can be configured to transmit status reports to the customer care support framework 104 or another administrative entity on a first scheduled basis. The second scheduler can be configured to transmit notifications to subscribers on a second scheduled basis.

Example Computing Device Components

Figure 2:
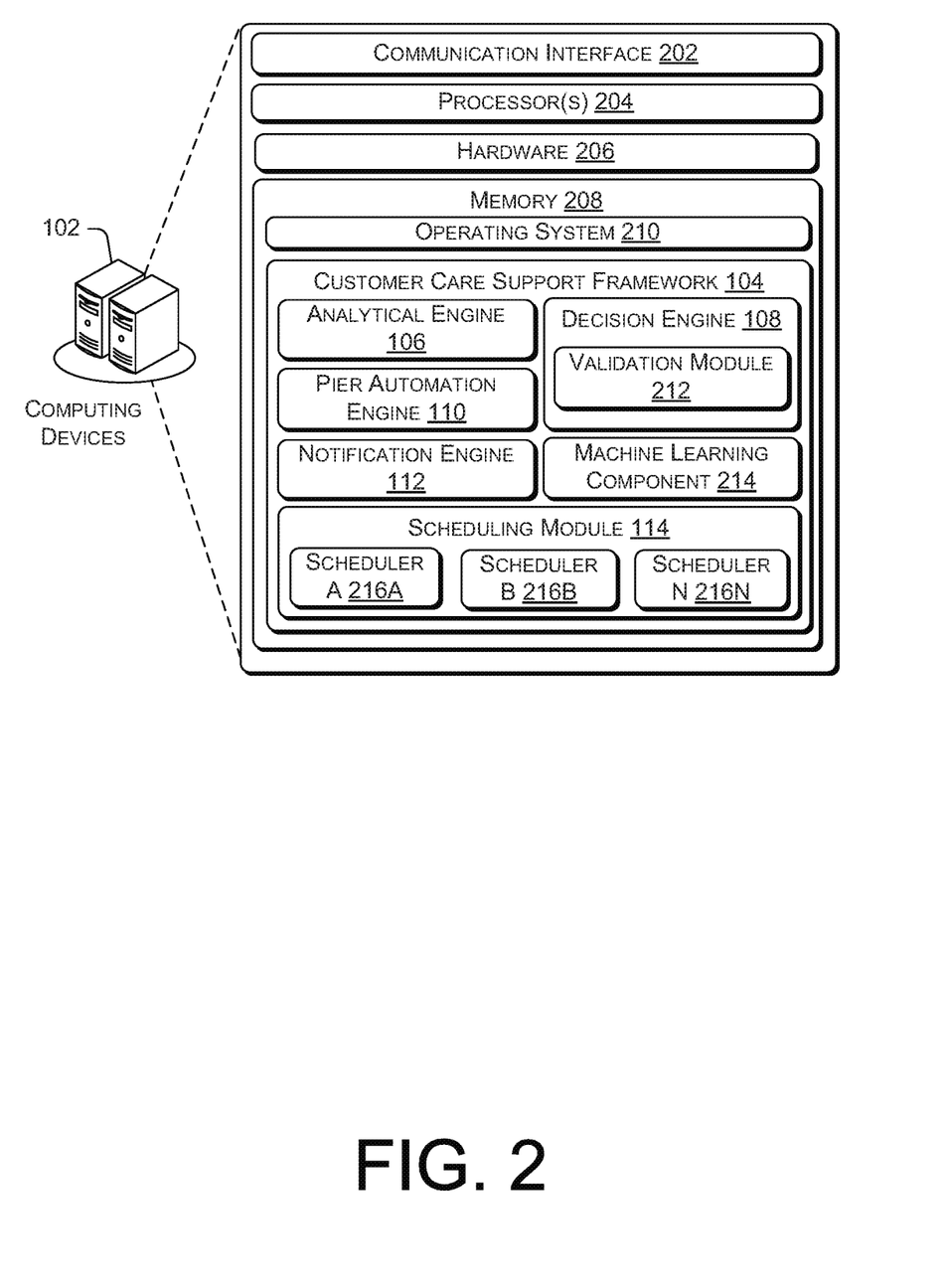
FIG. 2 is a block diagram showing various components of an illustrative computing device that implements a predictive customer care support framework.

FIG. 2 is a block diagram showing various components of an illustrative computing device 102. It is noted that the computing device 102 as described herein can operate with more or fewer of the components shown herein. Additionally, the computing device 102 as shown herein or portions thereof can serve as a representation of one or more of the computing devices of the present system.

The computing device 102 may include a communication interface 202, one or more processor(s) 204, hardware 206, and memory 208. The communication interface 202 may include wireless and/or wired communication components that enable the computing device 102 to transmit data to and receive data from other networked devices. In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the computing device 102.

The processor(s) 204 and the memory 208 of the computing device 102 may implement an operating system 210 and the customer care support framework 104. The operating system 210 may include components that enable the computing device 102 to receive and transmit data via various interfaces (e.g., user controls, a communication interface, and/or memory input/output devices), as well as process data using the processor(s) 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The customer care support framework 104 may include the analytical engine 106, the decision engine 108, the pier automation engine 110, the notification engine 112, and the scheduling module 114. It is noted that the functions of one or more of the framework 104 engine or modules can overlap in whole or in part in order to provide redundancy and reliability. In various embodiments, the customer care support framework 104 can also include a machine learning component 214. The machine learning component 214 can comprise machine learning algorithms and trained machine learning models provided with the machine learning algorithms and training data. The machine learning algorithms can comprise Bayesian algorithm, a decision tree algorithm, a Support Vector Machine (SVM) algorithm, a Learning Vector Quantization (LVQ) algorithm, a K-Nearest Neighbors (KNN) algorithm, a Linear Discriminant Analysis (LDA) algorithm, and/or so forth. The training data can comprise network performance data or key performance indicator data, user equipment data, and/or so forth.

The decision engine 108 can receive incoming trouble tickets for preprocessing ticket data associated with the trouble tickets. The decision engine 108 can parse the ticket data, which may comprise a natural language (e.g., textual data), computer languages, and/or data structures. In this regard, the decision engine 108 can include a dedicated parsing component that analyzes the ticket data to extract certain parts of the text. The decision engine 108 can categorize and/or tag the trouble tickets based at least partially on the parsed ticket data. In this way, the trouble tickets can be organized or sorted based on the type of issue addressed, the type user equipment at issue, the type of subscription or service agreement associated with the subscriber, and/or other parameters.

Additionally, the decision engine 108 may utilize various decision support tools in order to identify the appropriate data sources from which the decision engine 108 can reference or request relevant information to resolve the trouble ticket. For example, a decision support tool of the decision engine 108 can apply a decision tree scheme to automatically identify data sources from which requested data can be retrieved to the decision engine 108. The decision support tool can operate with the machine learning component 214 of the customer care support framework 104. The retrieved data can be consolidated via a data consolidation tool into a bundled format in order to expedite the data retrieval process, which can help decrease the trouble ticket processing time. In this regard, similar or identical data can be identified and a degree of affinity among the data can be calculated in order to remove redundant data, wherein the data is redundant if the degree of affinity exceeds a predetermined value or falls within a predetermined range.

The decision engine 108 can include a validation module 212 for validating ticket data in the incoming trouble tickets. The validation module 212 can determine whether some or all of the ticket data is valid using a set of predetermined parameters. For example, the validation module 212 can determine whether the ticket data comprises valid EID or subscriber account information. If the validation module 212 determines that one or more tickets data is invalid, the validation module 212 can trigger the pier automation engine 110 to close the trouble ticket. Additionally, or alternatively, the validation module 212 can trigger the notification engine 112 to request the subscriber for additional information or to submit a new trouble ticket. In various embodiments, the validation module 212 is configured to recognize typos and automatically provide suggestions.

The decision engine 108 can determine whether the number of incoming trouble tickets exceeds a predetermined threshold. If the number of incoming trouble tickets exceeds the predetermined threshold, the decision engine 108 can trigger the notification engine 112 to alert an administrative entity. Additionally, the decision engine 108 can determine whether the number of incoming trouble tickets pertaining to a particular network issue exceed a predetermined threshold. If the number of incoming trouble tickets pertaining to a particular network issue exceeds a predetermined threshold, the decision engine 108 may trigger the analytical engine 106 to determine whether there is a potential network issue and to identify its root cause.

The analytical engine 106 can also utilize various decision support tools and/or the machine learning component 214 to identify a root cause for the network issues associated with trouble tickets or the potential network issues and to implement recommended solutions. The analytical engine 106 can dynamically evaluate the parsed ticket data and the retrieved data from the one or more data sources in order to determine the root cause. In various embodiments, the analytical engine 106 can identify multiple root causes, in which case multiple solutions can be employed. The analytical engine 106 can refer to a solutions table that can be maintained in a solutions database for implementation. Upon implementing one or more solutions, the analytical engine 106 can monitor the implemented solutions in operation. If the one or more implemented solutions is successful, the analytical engine 106 can trigger the pier automation engine 110 to close the trouble ticket. Additionally, the analytical engine 106 can trigger the notification engine 112 to provide an alert or a notification to a subscriber corresponding to the trouble ticket.

In various embodiments, the notification engine 112 can provide notifications to subscribers or the telecommunications service provider on a scheduled basis as determined by the scheduling module 114. The scheduling module 114 may include a plurality of schedulers 216A-216N. In the illustrated embodiment, the scheduling module 114 includes a first scheduler 216A, a second scheduler 216B, and a third scheduler 216N. Each scheduler 216A-216N can be configured to manage automatic alerts and notifications for different types of alerts and notifications. For example, the first scheduler 216A can be configured to provide alerts and notifications related to trouble tickets to subscribers. In another example, the second scheduler 216B can be configured to provide threshold alerts to the telecommunications service provider. In yet another example, the third scheduler 216C can be configured to provide status reports to the telecommunications service provider.

Example Processes

Figure 3:
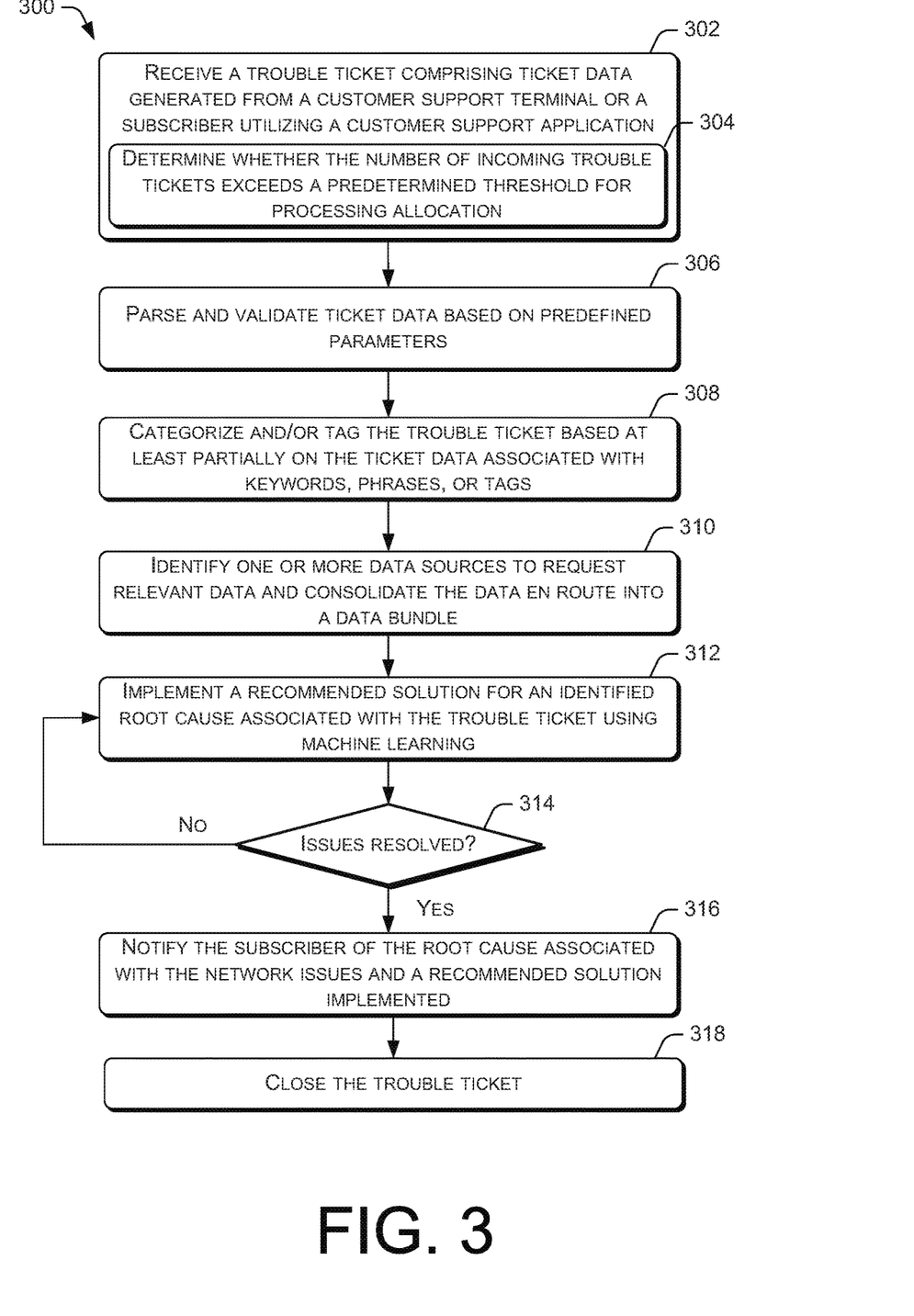
FIG. 3 is a flow diagram of an example process for expediting the process for resolving trouble tickets received at a customer support terminal.
Figure 4:
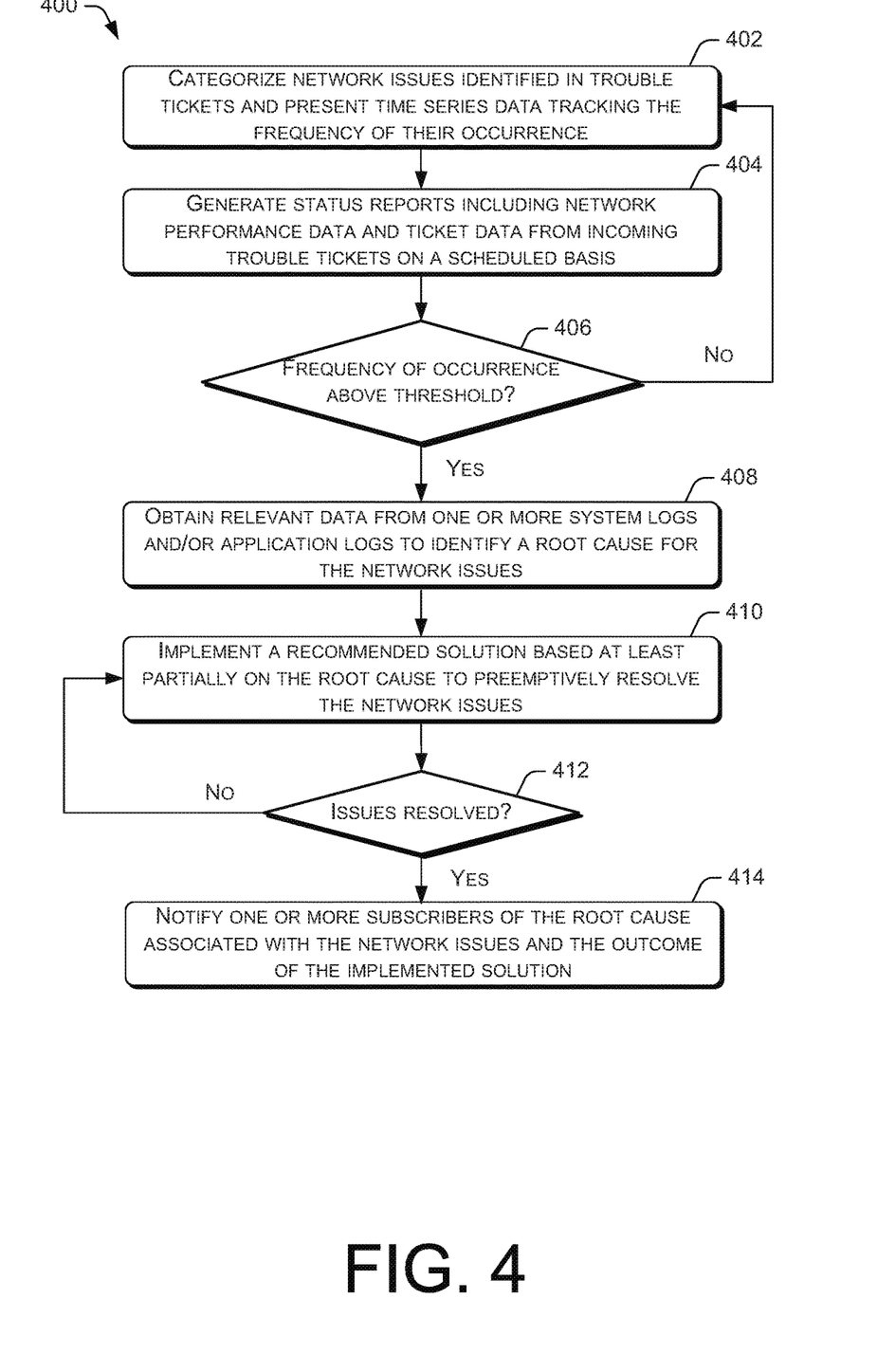
FIG. 4 is a flow diagram of an example process for preemptively troubleshooting potential network issues based on statistical analysis of events logged.

FIGS. 3 and 4 present illustrative processes 300-400 for forecasting and managing customer care support. The processes 300-400 are illustrated as a collection of blocks in logical flowcharts, which represent a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-400 are described with reference to the architecture 100 of FIG. 1.

FIG. 3 is a flow diagram of an example process 300 for decreasing the time to resolving trouble tickets received at a customer support terminal, from the perspective of one or more computing devices providing a customer care support framework. At block 302, the decision engine of the customer care support framework receives a trouble ticket comprising ticket data generated from a customer support terminal or a subscriber utilizing a customer support application from a user equipment. The ticket data can comprise information related to the subscriber and/or problems experienced by the subscriber. The problems can comprise network issues, device issues, billing issues, technical issues, account issues, operational issues, and/or so forth. At block 304, the decision engine determines whether the number of incoming trouble tickets exceeds a predetermined threshold for processing allocation. If the number of incoming trouble tickets exceeds a predetermined threshold, the decision engine can utilize any number of appropriate load balancing techniques to manage the incoming trouble tickets. Additionally, the decision engine can trigger the notification engine to provide threshold alerts to customer support technicians or administrators working with a telecommunications service provider, in which additional computing devices may be deployed on the fly.

At block 306, the decision engine, via a validation module, can determine whether parsed ticket data is valid. If the ticket data is invalid, the decision engine triggers the pier automation engine to close the trouble ticket. For example, if the ticket data comprises information about a non-existing customer account, then the decision engine can trigger the pier automation engine to close the trouble ticket. In another example, if the ticket data comprises device information that does not match an existing customer account, then the decision engine can trigger the pier automation engine to close the trouble ticket. In various embodiments, the decision engine can also trigger the notification engine to notify the subscriber that the ticket data is invalid and to request the subscriber to submit a new trouble ticket or edit the ticket data in the existing trouble ticket.

If the trouble ticket comprises valid ticket data, the decision engine can categorize the trouble ticket based at least partially on the ticket data, as indicated in block 308. For example, the decision engine can categorize the trouble tickets by the type of network issues included in the trouble tickets. In another example, the decision engine can categorize the trouble tickets by the type of user equipment at issue in the trouble ticket. The decision engine can also tag the trouble ticket to associate the trouble ticket with one or more keywords or phrases.

At block 310, the decision engine can request for data that is relevant to the trouble ticket from one or more data sources (e.g., system logs and/or application logs) in order to identify a root cause. The decision engine can utilize decision support tools and or a machine learning component to identify the one or more data sources from which relevant data can be obtained to resolve the trouble tickets. In this regard, the decision engine can parse the ticket data to run each parsed ticket data through a decision tree. For instance, if the decision engine determines that parsed ticket data comprises information relating to a subscriber's account, the decision engine identifies HLR as the appropriate data source and can request the HLR to transmit information relating to the subscriber's account. Additionally, if the ticket data comprises information related to device issues, the decision engine identifies a device management entity or a device registration database as the appropriate data source and can request these data sources to transmit data relating to the device issues. In this way, the decision engine eliminates the need to manually identify one or more data sources to obtain information to resolve trouble tickets.

The requested data from the one or more data sources can be bundled in appropriate file formats and delivered to the decision engine and/or the analytical engine. The decision engine can be operatively connected to a data consolidation tool that can intercept data en route to the decision engine. Similar data can be sorted together into a set and removed based on the degree of affinity within the data set.

Upon receiving data from the one or more data sources, the analytical engine can identify a root cause for issues specified in the trouble ticket. The analytical engine can utilize the decision supporting tool to identify the root cause. In various embodiments, the analytical engine can also employ the machine learning component and decision logic to identify a root cause. It is noted that machine learning and decision logic can also apply to other components of the framework. The analytical engine can also utilize the identified root cause to classify the type of issues.

At block 312, the analytical engine implements a recommended solution based at least partially on the root cause identified. The analytical engine can refer to a solutions table, which may comprise one or more solutions to resolve the root cause. The analytical engine can select a solution based on one or more parameters such as the probability of success of the solution. Additionally, session notes associated with previous trouble tickets can be used, which may comprise issues having the same or similar root cause. The session notes associated with previous trouble tickets can indicate whether the solution was successful and whether additional steps were implemented to resolve the trouble tickets. At decision block 314, the decision engine can determine whether issues associated with the trouble ticket are resolved. In this regard, the decision engine can conduct monitoring for a predetermined period of time in order to ensure that the selected solution is successful. If the issues are resolved ("yes" response from the decision block 314), the notification engine can transmit an alert or a notification to the subscriber corresponding to the trouble ticket, as indicated in block 316. The notification can comprise information relating to the root cause associated with the network issues and a recommended solution that was implemented. If the issues are not resolved ("no" response from the decision block 314), a different solution (e.g., a secondary solution) can be implemented. At block 318, the pier automation engine can close the trouble ticket upon determining that the trouble ticket is resolved. The pier automation engine can generate a session memo associated with the trouble ticket. The session memo can be managed in a data store.

FIG. 4 is a flow diagram of an example process for preemptively troubleshooting potential network issues based on statistical analysis of events logged. At block 402, the decision engine can categorize network issues identified in trouble tickets and track the frequency of the occurrence of each network issue. At block 404, the decision engine can generate status reports based on various network performance parameters and the categories of network issues identified and the frequency of their occurrence in the incoming trouble tickets on a scheduled basis. In various embodiments, the decision engine can receive status reports generated via various network elements (e.g., a report server). The status reports can be maintained at one or more data sources, logs, cache, servers, and/or so forth.

At decision block 406, the decision engine can determine whether the frequency of occurrence of a network issue is above a predetermined threshold. If the frequency of occurrence is above the predetermined threshold ("yes" response from the decision block 406), the decision engine can request relevant data (e.g., network performance data) from one or more system logs and/or application logs. The system logs can include network log files can include key performance indicator data. Upon obtaining relevant data, the analytical engine can identify a root cause for the network issues as indicated in block 408. The analytical engine can utilize machine learning techniques and/or decision support tools to identify a root cause. If the analytical engine is unable to identify a root cause or if additional information is needed, the analytical engine can notify an administrator for input. If the frequency of occurrence is not above the predetermined threshold ("no" response from the decision block 406), the decision engine can continue categorizing network issues identified in trouble tickets and track the frequency of the occurrence of each network issue.

At block 410, the analytical engine can implement a recommended solution based at least partially on the root cause and information obtained from the retrieved data and the status reports to preemptively resolve the network issues. The analytical engine can also utilize a machine learning model of a machine learning component to select a solution for resolving the network issues. At decision block 412, the decision engine can determine whether issues associated with the trouble ticket are resolved. In this regard, the decision engine can conduct monitoring for a predetermined period of time in order to ensure that the selected solution is successful. If the issues are resolved ("yes" response from the decision block 412), the notification engine can transmit an alert or a notification (e.g., email, a text message, etc.) to subscribers to notify the subscribers of potential network issues addressed and one or more solutions implemented as indicated in block 414. If the issues are not resolved ("no" response from the decision block 412, the analytical engine can implement a secondary solution based at least partially on the root cause and information obtained from the retrieved data and the status reports.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving a request to resolve a trouble ticket corresponding to a subscriber, the trouble ticket comprising validated ticket data including an embedded UICC identifier (EID), a subscriber identifier, and a subscriber status;
   identifying one or more data sources that include a set of data associated with the EID, the subscriber identifier, or the subscriber status;
   receiving a data bundle that includes the set of data as consolidated from the one or more data sources;
   upon receiving the data bundle, determining based at least partially on the set of data a root cause of an anomaly identified in the validated ticket data;
   recommending one or more solutions to resolve the anomaly, the one or more solutions obtained from a troubleshooting and support reference;
   upon determining that the one or more solutions implemented resolved the anomaly, closing the trouble ticket; and
   identifying similar or identical data to generate data sets;
   determining a degree of affinity among the similar or identical data in the data sets; and
   removing redundant data from the data sets if the degree of affinity exceeds a predetermined threshold.

2. The one or more non-transitory computer-readable media of claim 1, wherein the one or more data sources comprise a data store located on a core network of a cellular network.

3. The one or more non-transitory computer-readable media of claim 1, wherein the acts further comprise:
   parsing the validated ticket data based at least partially on a set of predetermined parameters, wherein each parsed ticket data is validated as valid or invalid; and
   upon determining that one or more parsed ticket data is invalid, closing the trouble ticket.

4. The one or more non-transitory computer-readable media of claim 1, wherein the acts further comprise:
   categorizing the trouble ticket based at least partially on the validated ticket data, wherein the validated ticket data comprises one or more keywords or phrases associated with one or more categories, further wherein the trouble ticket comprises one or more tags associated with the one or more categories.

5. The one or more non-transitory computer-readable media of claim 1, wherein the subscriber identifier correlates to an account that is associated with a plurality of user equipment and a plurality of users.

6. The one or more non-transitory computer-readable media of claim 1, wherein acts further comprise:
   arranging the one or more solutions in a specific order based on one or more parameters; and
   selecting the one or more solutions, based at least partially on the specific order.

7. The one or more non-transitory computer-readable media of claim 1, wherein the acts further comprise:
   generating a time series data associated with the anomaly identified in the validated ticket data;
   identifying a trend for the anomaly identified in the validated ticket data based at least partially on the time series data; and
   upon determining that the trend comprises a frequency value exceeding a predetermined threshold, propagating a threshold alert to implement the one or more solutions to resolve the anomaly in a second trouble ticket, the second trouble ticket comprising a second ticket data identifying the root cause.

8. The one or more non-transitory computer-readable media of claim 1, wherein the one or more non-transitory computer-readable media comprises an on-premise server.

9. A computer-implemented method, comprising:
   generating a status report on a scheduled basis, the status report comprising ticket data associated with processed trouble tickets;
   categorizing the processed trouble tickets based at least partially on an anomaly associated with at least one network issue and a frequency of occurrence of the at least one network issue;
   upon determining that the frequency of occurrence exceeds a predetermined threshold, concurrently obtaining network log files from one or more data sources to identify a root cause for the at least one network issue, wherein the network log files are consolidated into a data bundle before delivery; and
   preemptively recommending one or more solutions to resolve the anomaly based at least partially on the network log files and the root cause, the one or more solutions obtained from a troubleshooting and support reference.

10. The computer-implemented method of claim 9, further comprising the steps of:
    upon determining that the frequency of occurrence exceeds the predetermined threshold, propagating a threshold alert to select the one or more solutions, wherein the one or more solutions is arranged in a specific order of preference for implementation, the one or more solutions selected based at least partially on a machine learning model.

11. The computer-implemented method of claim 9, further comprising the steps of:
    determining a potential impact factor associated with the anomaly for one or more subscribers, wherein the potential impact factor is based at least partially on one or more parameters related to network usage and a user equipment associated with the one or more subscribers; and
    transmitting notifications to one or more subscribers with the potential impact factor exceeding a predetermined value.

12. The computer-implemented method of claim 9, wherein the obtaining comprises the steps of:
    identifying similar or identical data in the network log files to generate data sets;
    determining a degree of affinity among the similar or identical data in the data sets; and
    removing redundant data if the degree of affinity exceeds a predetermined value.

13. The computer-implemented method of claim 9, wherein the one or more data sources comprises a home subscriber server (HSS) of a telecommunication network or a home location register (HLR) of the telecommunication network.

14. The computer-implemented method of claim 9, wherein the network log files comprise key performance indicator data.

15. The computer-implemented method of claim 10, wherein the machine learning model utilizes a decision tree algorithm.

16. A system, comprising:
one or more non-transitory storage mediums configured to provide stored code segments, the one or more non-transitory storage mediums coupled to one or more processors, each configured to execute the stored code segments and causing the one or more processors to:
 receive a request to resolve a trouble ticket corresponding to a subscriber, the trouble ticket comprising validated ticket data including an embedded UICC identifier (EID), a subscriber identifier, and a subscriber status;
categorize the trouble ticket based at least partially on an anomaly associated with at least one network issue and a frequency of occurrence of the at least one network issue;
 identify one or more data sources to concurrently retrieve from the one or more data sources a set of data associated with the EID, the subscriber identifier, or the subscriber status;
 receive a data bundle that includes the set of data as consolidated from the one or more data sources;
 upon receiving the data bundle, determine based at least partially on the set of data a root cause of the anomaly identified in the validated ticket data;
 recommend one or more solutions to resolve the anomaly, the one or more solutions obtained from a troubleshooting and support reference;
 upon determining that the one or more solutions implemented resolved the anomaly, close the trouble ticket; and
 upon determining that the frequency of occurrence exceeds a predetermined threshold, concurrently obtain network log files from one or more data sources to identify the root cause for the at least one network issue, wherein the network log files are consolidated into a second data bundle before delivery.

17. The system of claim 16, wherein the one or more processors is further configured to:
 determine a potential impact factor associated with the anomaly for one or more subscribers, wherein the potential impact factor is based at least partially on one or more parameters related to network usage and a user equipment associated with the one or more subscribers; and
 transmit notifications to one or more subscribers with the potential impact factor exceeding a predetermined value.

18. The system of claim 16, wherein the one or more processors is further configured to:
 intercept the set of data retrieved from the one or more data sources en route to the one or more non-transitory storage mediums, wherein the set of data retrieved comprises network log files;
 identify similar or identical data in the set of data to determine a degree of affinity among the similar or identical data; and
 remove redundant data if the degree of affinity exceeds a predetermined threshold.

* * * * *